April 5, 1960          J. KRITZ          2,931,223

TRANSDUCERS FOR ACOUSTIC FLOWMETER

Original Filed Dec. 10, 1954          5 Sheets-Sheet 1

INVENTOR.
Jack Kritz

April 5, 1960   J. KRITZ   2,931,223
TRANSDUCERS FOR ACOUSTIC FLOWMETER
Original Filed Dec. 10. 1954   5 Sheets-Sheet 2

INVENTOR.
Jack Kritz
BY
Moser, Nolte, Crews+Berry
ATTORNEYS

April 5, 1960 J. KRITZ 2,931,223
TRANSDUCERS FOR ACOUSTIC FLOWMETER
Original Filed Dec. 10, 1954 5 Sheets-Sheet 3
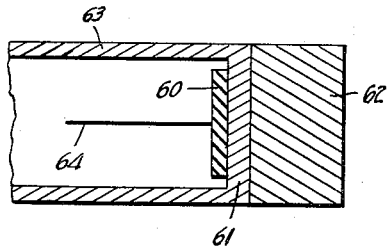
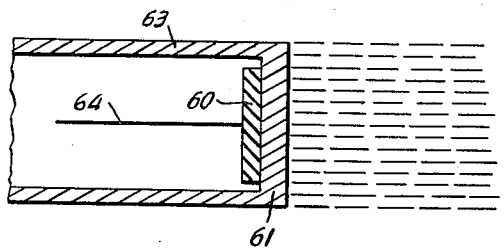
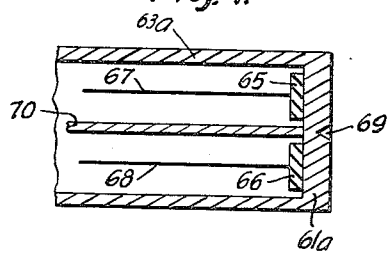
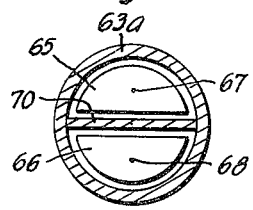
INVENTOR.
Jack Kritz
BY
ATTORNEYS April 5, 1960 J. KRITZ 2,931,223
TRANSDUCERS FOR ACOUSTIC FLOWMETER
Original Filed Dec. 10, 1954 5 Sheets-Sheet 4

INVENTOR.
Jack Kritz
BY
Moses, Nolte Crews & Berry
ATTORNEYS

April 5, 1960  J. KRITZ  2,931,223
TRANSDUCERS FOR ACOUSTIC FLOWMETER
Original Filed Dec. 10. 1954  5 Sheets-Sheet 5

INVENTOR.
Jack Kritz
BY
Moses, Nolte, Crews & Berry
ATTORNEYS

United States Patent Office 2,931,223
Patented Apr. 5, 1960

2,931,223

TRANSDUCERS FOR ACOUSTIC FLOWMETER

Jack Kritz, Flushing, N.Y.,

Original application December 10, 1954, Serial No. 474,403. Divided and this application January 30, 1956, Serial No. 562,265

5 Claims. (Cl. 73—194)

This invention relates to transducer devices and particularly to such devices for use in flowmeters for measuring the velocity characteristics of a fluid.

This application is a division of my copending application, Serial No. 474,403, filed December 10, 1954.

The present application is a continuation-in-part of my copending applications, Serial No. 67,503, filed December 27, 1948, now Patent No. 2,826,912, and application Serial No. 209,295, filed February 3, 1951 and Serial No. 209,296, filed February 3, 1951, now abandoned.

By the propagation of acoustic waves traveling simultaneously in opposite directions in a fluid, it is possible to determine the flow velocity of the fluid independently of the velocity of propagation of acoustic waves therein. Similarly, it is possible to determine the velocity of propagation of acoustic waves in the fluid, independently of any component of flow velocity of the fluid in the direction of measurement.

Transducers according to the invention, are particularly applicable to a flowmeter having two loops for transmission in two different directions. Each loop consists of a transmitting and receiving means interconnected by a feedback circuit including an amplifier and a wave packet generator. Each received wave packet is amplified and triggers the generator so as to cause wave packets to be repropagated in a sustained manner. Any change in the flow velocity of the fluid will be accompanied by a corresponding change in the repetition frequency of the wave packets, and the magnitudes of the respective changes will be in constant direct ratio to the flow velocities being measured.

In a flowmeter having two feedback loops it is desirable to have the fluid paths of the loops equal in length in order to obtain high accuracy. Where four separate transducers are placed in the fluid conduit, the equality of the paths is extremely difficult to obtain and hold. Moreover, when the two wave paths are physically remote from each other, even slight differences in the state of the fluid in the different path regions cause slightly different acoustic propagation velocities resulting in large errors in flow measurement, especially at low flow velocities.

One object of the present invention is to provide a transducer arrangement which results in substantially equal path lengths.

Another object of the invention is to provide a transducer arrangement in which the wave paths in opposite directions through the fluid are physically close.

Another object of the invention is to increase the amount of transmitted wave energy picked up by the receiving transducers.

A further object of the invention is to improve the shape of a pulse or packet of waves transmitted by the transducers.

A further object of the invention is to improve the efficiency of supersonic frequency transducers.

A further object of the invention is to simplify the installation and improve the operation of the transducers of a flowmeter which utilizes bi-directional supersonic wave transmission through a fluid.

Other objects and advantages of the invention will be apparent from the following detailed description and the accompanying drawing, in which:

Referring to the drawing:

Fig. 4 is a partial sectional view of an improved transducer according to the invention.

Fig. 6 is a partial sectional view of another transducer according to the invention.

Figs. 7 and 8 are views of a dual transducer.

Figure 11:
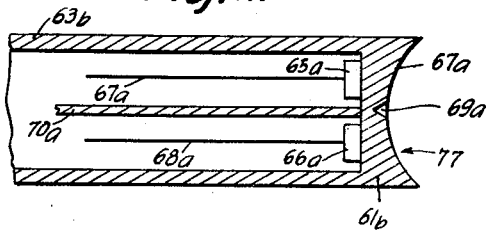
Fig. 11 is a partial sectional view of a dual transducer having focusing means.
Figure 12:
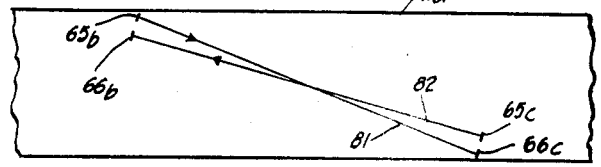
Figure 13:
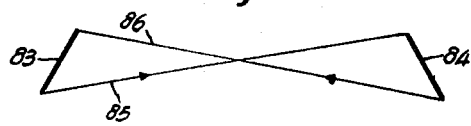

Figs. 12 and 13 relate to an arrangement for a pair of transducers of the type shown in Fig. 11.

Figure 14:
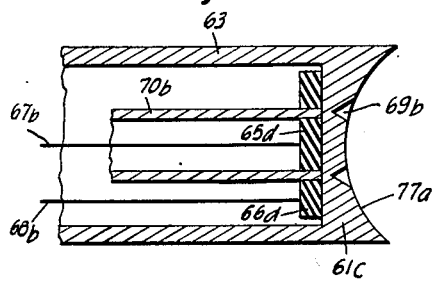
Figure 15:
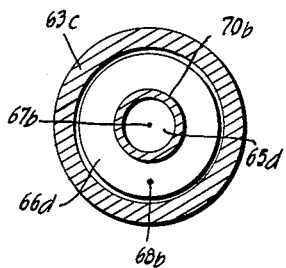

Figs. 14 and 15 are partial sectional views of still another embodiment of a dual transducer.

Figure 16:
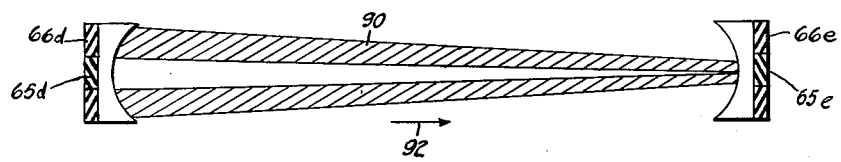
Figure 17:
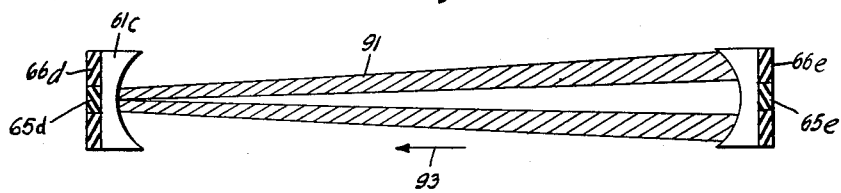

Figs. 16 and 17 illustrate the operation of the transducers shown in Figs. 14 and 15.

Figure 1:
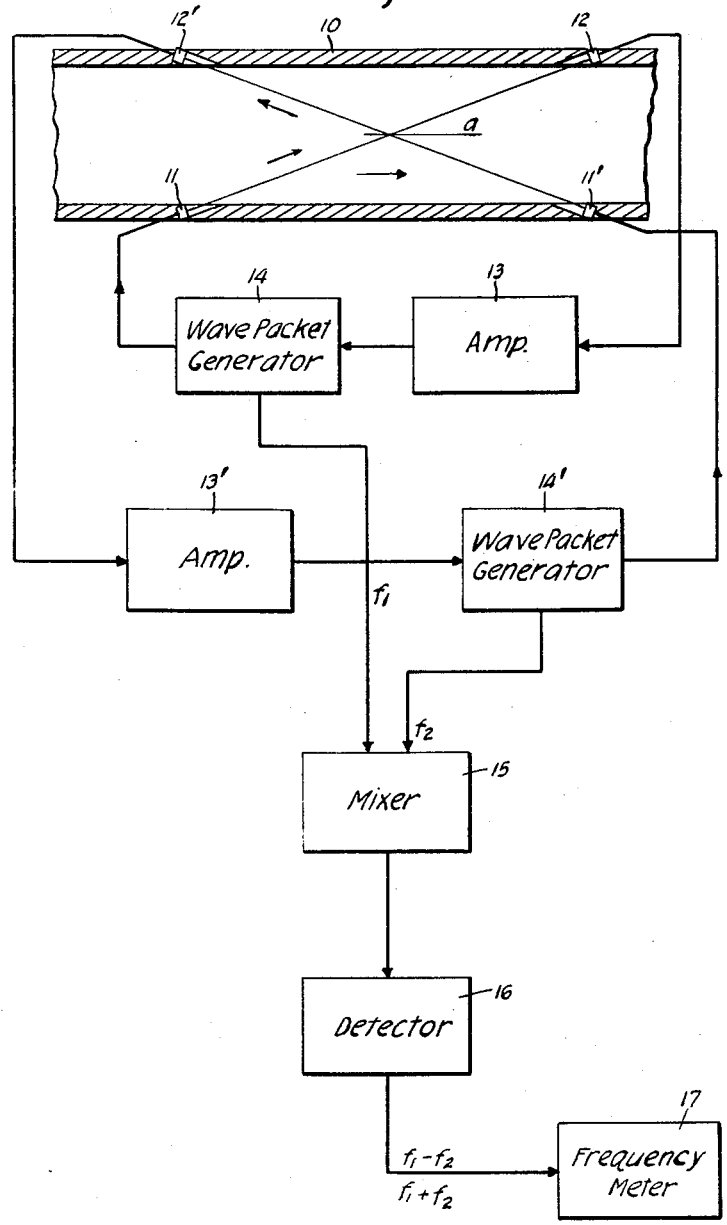
Fig. 1 is a schematic circuit diagram illustrating an embodiment of the invention.

In Fig. 1, an embodiment of the invention is illustrated utilizing four transducers mounted in a fluid conduit 10 for producing upstream and downstream transmission. The transmitting transducer 11 is arranged to transmit waves downstream to the receiver 12, while the transducer 11' transmits to the receiver 12' in the upstream direction. The waves received by transducer 12 are impressed on an amplifier 13, and the amplified waves are supplied to a wave packet generator 14, which already is described in my parent application Serial No. 474,403. When the amplified wave impressed on generator 14 reaches a predetermined amplitude, generator 14 is triggered and responds by producing a limited train of waves, or a wave packet. The wave packet is then impressed on transmitter 11, and after being propagated through the fluid is received by receiver 12 and transmitted through the amplifier 13 to the generator 14. Generator 14 is thereby triggered again, and in this manner repeated wave packets are produced. The transducers 11', 12', amplifier 13' and wave packet generator 14' similarly produce a continuous sequence of wave packets which travel through the fluid in the upstream direction.

Mixer 15 has its two input terminals connected to the outputs of generators 14 and 14' respectively, and is provided with pulse signals whose repetition frequencies are $f_1$ and $f_2$, where $f_1$ is the repetition frequency of the wave packets at the generator 14 and $f_2$ is the repetition frequency of the wave packets at generator 14'. The mixed signals are fed to a detector 16 which produces in its output, signals representing the difference or sum of the two frequencies. The mixer-detector combination is a form of heterodyne converter or any other circuit capable of producing an output current having components of a frequency equal to the sum of $f_1$ and $f_2$ and a frequency equal to the difference between $f_1$ and $f_2$. Either of these frequency components is selected and fed to a frequency meter 17. The arithmetic difference $f_1-f_2$ is directly proportional to the flow velocity of the fluid independently of the propagation velocity of the acoustic waves therein. Similarly the arithmetic sum $f_1+f_2$ is directly proportional to the propagation velocity of the waves in the fluid independently of the velocity of flow of the fluid.

Figure 2:
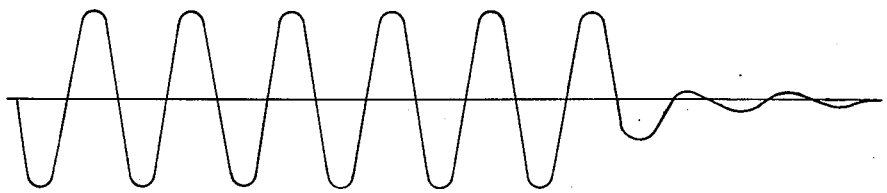
Figs. 2 and 3 illustrate the wave packets.
Figure 5:
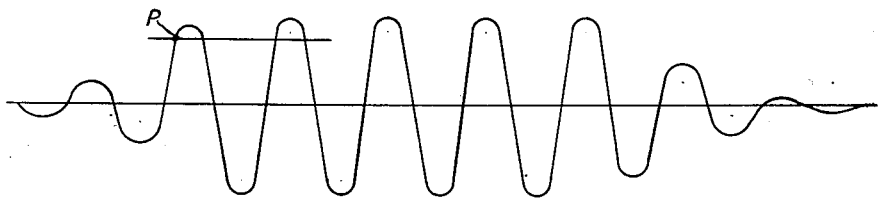
Fig. 5 is a diagram of a wave packet of improved form.

The triggering of the wave packet generator 14 is explained with reference to Figs. 2, 3 and 5. Generator 14 produces a short packet of high frequency oscillations at the resonant frequency of the transmitting and the receiving transducers. The wave form of such a packet is shown in Fig. 2. Due to the resonant character of the transducer and other circuit elements the signal received at generator 14 from amplifier 13 is not an exact replica of the voltage applied to the transmitting transducer 11, but rather builds up slowly in a fashion similar to that shown in Fig. 3. The wave packet generator 14 is normally quiescent and is triggered only when it receives a small predetermined voltage E. Consequently when the received voltage has built up to this predetermined voltage, as indicated at P, the generator 14 fires.

While the shape of the received wave packet and, particularly, the rate of signal buildup are functions of many variable elements, the period between successive zero crossings of the wave is a relatively stable quantity and is primarily determined by the inductive and capacitive values in the generator and by the transducer characteristics. In any particular design, the instability of the firing time is therefore confined to that ¼ cycle region between the previous zero value of the wave and the maximum of the designed chosen triggering cycle. This region is traversed with varying received levels due to fluid variations or amplifier variations. Nevertheless, due to the high frequency nature of the wave packet, the total possible time variation within this ¼ cycle is small. This therefore represents a marked improvement in the time stability of the feedback loop.

In a wave packet flowmeter, the received vibrations build up to their maximum value at a rate determined by the amount of mechanical loading presented to the crystal transducers. It is desirable, however, that the particular cycle of the wave packet chosen for triggering the wave packet generator have an amplitude considerably higher than the cycle immediately preceding it. This condition is desired in order to prevent firing at the wrong cycle. It is also desirable that the magnitude of succeeding cycles not be considerably higher than the chosen firing cycle so as to preclude interference in operation from random reflections.

Figure 3:
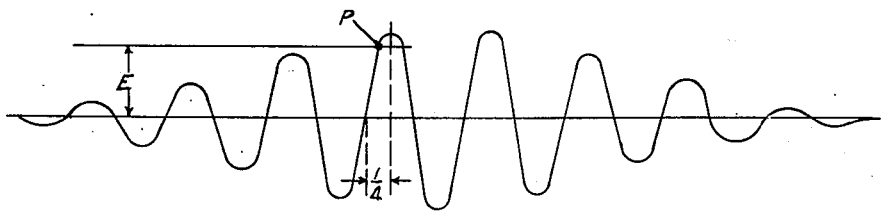

It has been found when using resonant piezoelectric crystals as transducers in direct contact with the fluid to be measured, that the wave packet buildup time is slow, while its eventual maximum amplitude is high, as shown in Fig. 3. In using such crystals, a relatively early cycle must be used to take advantage of a relatively large difference in amplitude between successive cycles.

A transducer for producing a wave packet having an improved wave form is illustrated in Fig. 4. The piezoelectric crystal 60 having a connection 64 is provided with a metal interface 61 between it and the fluid. Interface 61 may be provided by a cylindrical housing 63, as shown in Fig. 4 or 6. The high acoustic impedance of such a housing loads the crystal heavily and produces the desired characteristics described above. The overall loss to the early cycles of a crystal with such an interface is no higher than when the crystal is in direct contact with the fluid, due to the increased power absorbed from the crystal by the high acoustic impedance loading. In fact, a material such as magnesium or aluminum may be chosen for the interface which gives a gain for the early cycles over that obtained by direct contact between the crystal and the fluid. The crystal may be mounted on the interface 61 in any manner which assures an intimate contact therebetween. One method is to provide a pressure mounting with a thin film of coupling fluid between the crystal and the interface. Another is to provide a thin film of solid adhesive between the surfaces. The housing 63 separates the crystal from the fluid and has the important advantage of providing chemical and mechanical protection for the crystal. The improvement given by the metal interface is shown qualitatively by Fig. 5 in comparison with Fig. 3. In Fig. 5 the second positive half cycle has a much greater amplitude than the first positive half cycle and thereafter the amplitude of the wave packet remains nearly constant.

When the thickness of the interface 61 is greater than half the number of wavelengths of the wave packet, reflections from the metal-fluid boundary arrive back at the crystal when excitation is no longer present, and the thickness no longer contributes to the amplitude of the early cycle behavior. Thus thick metal slabs can be used without altering the performance. In certain instances, however, it is desirable to control the thickness of interface 61 to a specified value less than half the number of wavelengths produced by the wave packet generator. For example, a plate having a thickness of a half wavelength will cause the second cycle of the wave packet to be reinforced and give a further improvement, or conversely, a plate having a thickness of three quarters wavelength will tend to reduce the amplitude after one and a half cycles thus reducing reflection effects.

In Fig. 6 a material 62 having an appropriate acoustic impedance is fastened to the metal interface 61. The material 62 has an acoustic impedance preferably lying between that of the fluid to be measured and that of metal housing 63, in order to permit increased power transfer. When an additional layer such as 62 is desired for chemical protection of a more suitable crystal loading material, a layer having a very high acoustic impedance can be used if the layer is extremely thin, or if it is an integral number of half waves thick but less than half the length of a wave packet.

In previous flowmeters using two wave paths, crossed diagonal paths for acoustic transmission have been suggested, as shown in Fig. 1. Such an arrangement has these disadvantages: (1) great machining accuracy is required to insure equal path lengths; and (2) the paths are physically remote from each other so that even slight differences in the state of the fluid in the different paths cause slightly different propagation velocities which result in large errors in flow measurement, especially at low flow velocities. My prior applications, of which this application is a continuation-in-part, disclose hybrid and bridge methods which overcome the above noted objections. I shall now describe another means of overcoming these objections which approaches the characteristics of the hybrid method but does not require accurately balanced bridge or hybrid circuits.

In the transducer assembly shown in Figs. 7 and 8, the metallic cylindrical housing 63a has an end wall 61a which may be dimensioned as described in connection with Fig. 4, and may contact the fluid directly or through an impedance matching section such as the material 62 in Fig. 6. Within the housing 63a and on the wall 61a are a pair of crystals 65, 66 are mounted. One of these crystals serves as a transmitter and the other serves as a receiver. The crystals are provided with leads 67 and 68. The crystals may be semi-circular, although it will be understood that other crystal shapes can be used. Under certain conditions when the thickness of metal wall 61a is large, acoustic coupling between the crystals occurs. Such unwanted coupling is reduced by a diametrical notch 69 cut in the metal interface 61a so as to separate the two active halves of interface 61a. An electrical shield 70 prevents electrical coupling between the two crystals.

Figure 9:
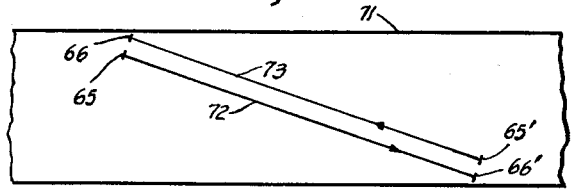
Fig. 9 illustrates an arrangement of dual transducers such as shown in Figs. 7 and 8.

The dual transducer shown in Figs. 7 and 8 not only has the advantages of the transducer shown in Fig. 4, but has the further important advantage that it greatly simplifies the obtention of substantially equal and close travel paths for the waves in the fluid. The manner in which these advantages are obtained is illustrated in Fig. 9. One dual transducer of the type shown in Figs. 7 and 8 is positioned on one side of the fluid conduit 71 and a similar dual transducer is positioned in spaced relation to the first transducer device on the opposite side of the fluid conduit. The crystals 65 and 65' are transmitters and crystals 66 and 66' are receivers. The crystals in the two transducing devices are arranged to give two close and parallel paths 72, 73. Moreover, the lengths of the paths can be readily equalized with far greater accuracy than can be generally obtained by the use of four separate transducers arranged as shown in Fig. 1 for example. To make the paths equal in length all that is necessary is to make the end walls of the transducer housings parallel.

Figure 10:
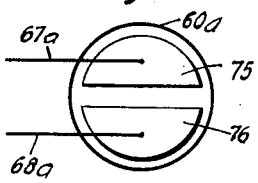
Fig. 10 is an end view of another crystal arrangement for a dual transducer.

Instead of using two separate crystals to form a dual transducer a single crystal slab 60a may be used, as shown in Fig. 10. On the slab 60a there are mounted two separate electrodes 75 and 76, which may be semicircular, having separate leads 67a and 68a. It is to be understood that in any crystal configuration disclosed herein several crystals may be replaced by a single crystal having several electrodes.

Fig. 11 shows another dual transducer in which the housing 63b, crystals 65a and 66a, and leads 67a and 68a may be similar to those of Figs. 7 and 8. The crystals 65a and 66a are isolated or decoupled from each other by the groove 69a and electric shield 70a. The end wall 61b has a curved outer face 77. The face 77 is curved to focus the transmitter waves to a line or a point by making the face 77 cylindrical or spherical. It will be understood that if the material of the housing 63b has an index of refraction greater than that of the fluid, the wall 61b may require a convex rather than a concave curvature.

A pair of transducer assemblies of the type shown in Fig. 11 are arranged in a pipe 71a to give a pair of very close crossed wave paths 81, 82, as shown in Fig. 12. The crystal positions of one transducer assembly are represented by lines 65b, 66b, and of the other transducer assembly by lines 65c and 66c. The radius of curvature of the lens surface 77 for the desired paths 81, 82 is determined by the fundamental laws of wave propagation, considering the wave velocities in the metal and liquid media, and the deisred spacing between the transducer assemblies.

The arrangement shown in Fig. 12 has the further advantage that if, as shown in Fig. 13, the crystal seating surfaces 83 and 84 of the metal interfaces of a pair of transducer assemblies are displaced from their parallel positions equally and symmetrically the paths 85 and 86 remain equal in length.

Figs. 14 and 15 show an alternative arrangement in which a small circular crystal 65d is within a ring-shaped crystal 66d, the two crystals being separated by a metallic shield 70b. The wall 61c has a lens surface 77a and is provided with a circular groove 69b located in the portion of wall 61c which is intermediate crystals 65d and 66d. In other respects housing 63c may be similar to those described previously. The crystals 65d and 66d are provided with input and output leads 67b and 68b.

The operation of a pair of transducing devices of the type shown in Figs. 14 and 15 is schematically indicated in Figs. 16 and 17. In Fig. 16 the lens formed by wall 61c converges the waves produced by the transmitting crystal 66d into a beam 90 focused on the receiving crystal 65e of the opposite transducing device. Conversely the waves produced by the transmitting crystal 66e are converged into a beam 91 which is focused on the receiving crystal 65d. The beams 90 and 91 will be superimposed on each other. It is evident then that the two beams, which travel in the directions indicated by arrows 92, 93, will occupy nearly the same paths through the fluid, and that they will have substantially the same length by virtue of the fact that they extend between the same pair of transducing devices. A further advantage of these transducing devices is that the waves are concentrated into a high intensity beam at the receiving crystals. The resulting system, therefore, has an increased discrimination against unwanted reflections, and also requires less amplification for stable operation.

I have shown and described several embodiments of my invention and for the sake of simplicity have not illustrated every feature of my invention in connection with each embodiment thereof, but it will be evident that various features shown in different embodiments may be combined, and other changes and modifications may be made within the spirit and scope of the inventon as defined in the claims.

I claim:

1. A transducer arrangement comprising a conduit, a first acoustic wave transmitting and receiving means and a second acoustic wave transmitting and receiving means displaced from each other along the conduit and located in the walls of said conduit for acoustic contact with a wave propagating medium adapted to flow through the conduit for transmitting waves to and receiving waves from each other, each of said means comprising a housing having a wall facing the like wall of the other means, a pair of piezo-electric transducers on said wall inside said housing, an input lead connected to a first of said transducers and an output lead connected to the second of said pair of transducers, whereby the waves are adapted to travel between said first and second transmitting and receiving means in opposite directions through the wave propagating medium along nearly coincident paths.

2. A transducer arrangement according to claim 1 wherein each of said transmitting and receiving means includes means for focusing the waves transmitted thereby on said wall of the other transmitting and receiving means.

3. A transducer arrangement according to claim 2 wherein the external face of said wall of each housing is spherically concave.

4. A transducer arrangement according to claim 2 wherein the external face of said wall of each housing is cylindrically concave.

5. A transducer arrangement according to claim 3 wherein said wall is circular, said first piezo-electric transducer is a circular slab located at the center of said wall and said second piezo-electric transducer is ring-shaped and surrounds the circular slab.

References Cited in the file of this patent

UNITED STATES PATENTS

| | | |
|---|---|---|
| 2,384,465 | Harrison | Sept. 11, 1945 |
| 2,477,246 | Gillespie | July 26, 1949 |
| 2,480,535 | Alois et al. | Aug. 30, 1949 |
| 2,645,727 | Willard | July 14, 1953 |
| 2,657,319 | Smack | Oct. 19, 1953 |
| 2,669,121 | Garman et al. | Feb. 16, 1954 |
| 2,708,366 | Blocher et al. | May 17, 1955 |
| 2,748,369 | Smyth | May 29, 1956 |

FOREIGN PATENTS

| | | |
|---|---|---|
| 352,040 | Great Britain | June 29, 1931 |
| 603,644 | Great Britain | June 21, 1948 |
| 616,794 | Great Britain | Jan. 27, 1949 |
| 623,022 | Great Britain | May 11, 1949 |